(12) United States Patent
Dextraze

(10) Patent No.: US 11,387,705 B2
(45) Date of Patent: Jul. 12, 2022

(54) TORSIONAL MASS TUNED DAMPER

(71) Applicant: DANA TM4 INC., Boucherville (CA)

(72) Inventor: Jean-Philippe Dextraze, La Prairie (CA)

(73) Assignee: DANA TM4 INC., Boucherville (CA)

( * ) Notice: Subject to any disclaimer, the term of this patent is extended or adjusted under 35 U.S.C. 154(b) by 316 days.

(21) Appl. No.: 16/707,947

(22) Filed: Dec. 9, 2019

(65) Prior Publication Data

US 2021/0175775 A1 Jun. 10, 2021

(51) Int. Cl.
*H02K 7/04* (2006.01)
*F16F 15/28* (2006.01)
*H02K 1/18* (2006.01)

(52) U.S. Cl.
CPC ............. *H02K 7/04* (2013.01); *F16F 15/28* (2013.01); *H02K 1/187* (2013.01)

(58) Field of Classification Search
CPC ...... H01R 12/718; H02K 11/33; H02K 7/116; H02K 1/18; H02K 1/187; H02K 1/30; H02K 5/24; H02K 7/04; H05K 1/11; H05K 1/181; H05K 2201/09027; H05K 2201/1009; H05K 3/325; H05K 5/006; F16F 15/28; F16F 7/104; F04B 43/1253; F04B 49/065; F04B 49/20; F04B 53/22
See application file for complete search history.

(56) References Cited

U.S. PATENT DOCUMENTS

2018/0304896 A1* 10/2018 Katsura .............. B60K 6/547

FOREIGN PATENT DOCUMENTS

| CA | 2155256 A1 | * | 2/1996 | ............ F16F 7/104 |
| DE | 102017122367 A1 | * | 3/2019 | ............ H02K 1/2786 |
| DE | 102018106287 A1 | * | 9/2019 | ............ F16D 25/087 |
| EP | 1396921 A2 | * | 3/2004 | ............ B60K 6/405 |
| WO | WO-0006897 A2 | * | 2/2000 | ............ H02K 11/048 |
| WO | WO-0176041 A1 | * | 10/2001 | ........ F16F 15/12366 |
| WO | WO-2011147597 A1 | * | 12/2011 | ............ F16F 15/131 |
| WO | WO-2017069041 A1 | * | 4/2017 | ............ H02K 1/06 |

OTHER PUBLICATIONS

"Module 3, Torsional Vibration on Compressors and Pumps," YouTube Website, Available Online at https://www.youtube.com/watch?v=JvuaNII9IZs, Dec. 23, 2013, 3 pages.
"TM4 electric powertrain technologies for buses and commercial vehicle," YouTube Website, Available Online at https://www.youtube.com/watch?v=a7bytjEEdP4&t=47s, Jul. 31, 2014, 3 pages.
"Brake Tuned Absorber [TA]," Vibracoustic Website, Available Online at https://www.vibracoustic.com/en/products/passenger-cars/chassis/isolators-dampers/brake-tuned-absorber, Available as Eady as Jan. 2019, 2 pages.

* cited by examiner

*Primary Examiner* — Naishadh N Desai
(74) *Attorney, Agent, or Firm* — McCoy Russell LLP

(57) ABSTRACT

A mass tuned damper for electric machines, particularly those with an external rotor and an internal stator in cantilever arrangement. The mass tuned damper includes a body with a predetermined mass and a mounting mechanism with a predetermined rigidity configured to couple the body onto a mounting surface of the stator. The mass tuned damper is configured, by varying the mass of body and/or the rigidity of the mounting mechanism, to oscillate at a first frequency equal to, but at least partially out of phase with, a resonance frequency of the stator.

12 Claims, 9 Drawing Sheets

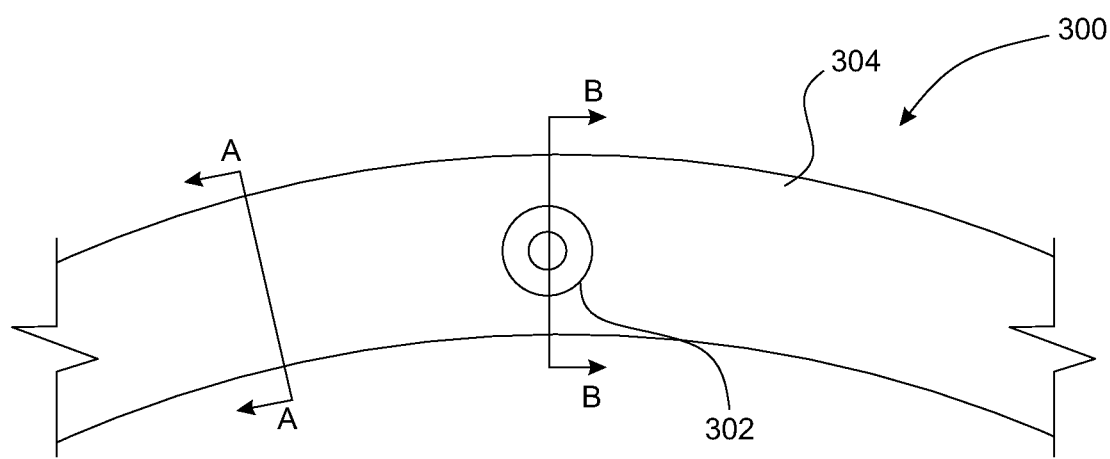
FIG. 7A
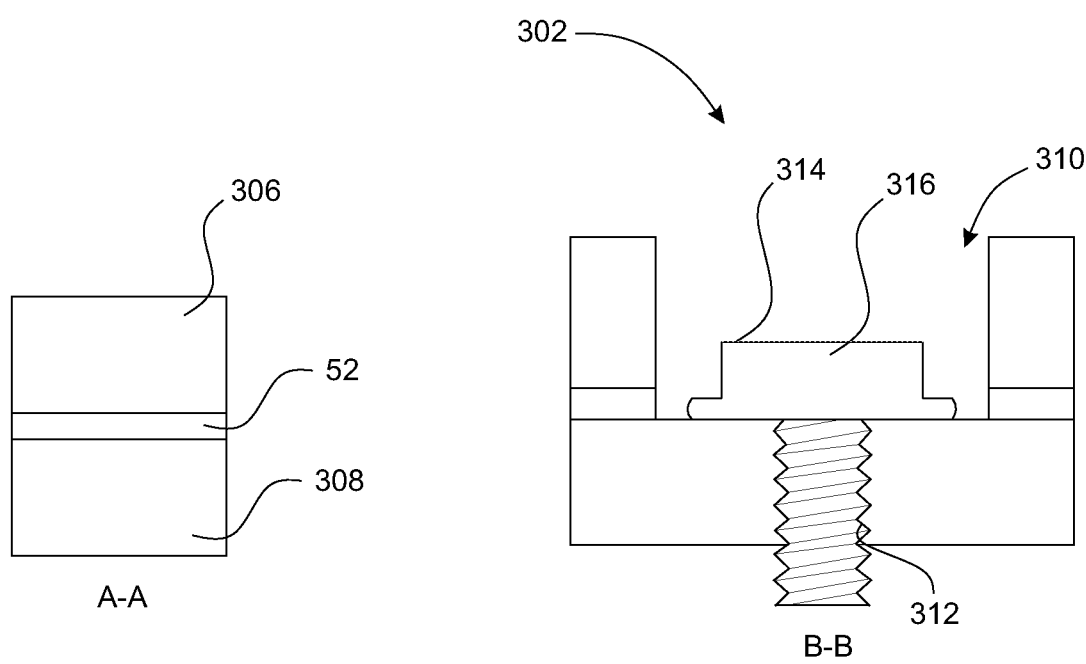
FIG. 7B
FIG. 7C

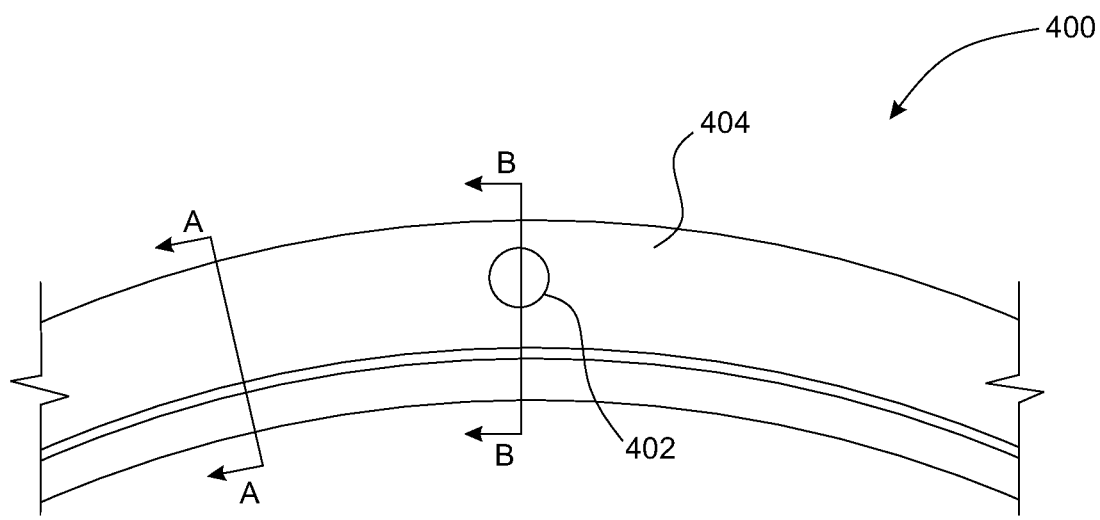
FIG. 8A
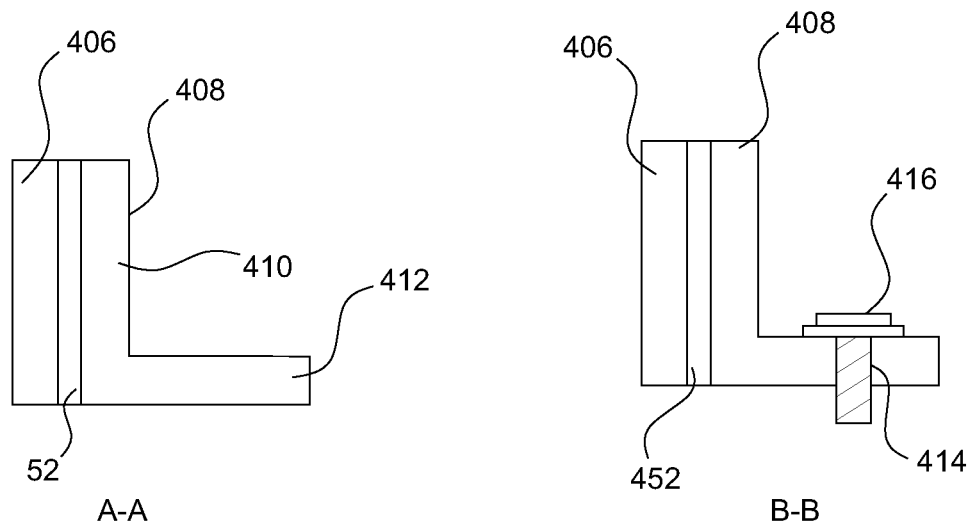
FIG. 8B
FIG. 8C

ND DAMPER

TORSIONAL MASS TUNED DAMPER

TECHNICAL FIELD

The present disclosure relates to torsional mass tuned damper, and in particular, to torsional mass tuned damper for electric machines.

BACKGROUND

Conventional topology of a permanent magnet electric motor includes a permanent magnet rotor positioned inside a wound stator where electric current in the windings interact with the magnetic field of the permanent magnet to generate rotational motion of a shaft. An alternative induction motor topology is the external rotor design where the stator is placed inside a rotor. This configuration may allow for a longer air gap radius and hence capable of generating more drive torque compared to that of a conventional internal rotor motor of similar size.

For external rotor electric machines, the stator is often secured in a cantilever arrangement where one end of the stator is bolted onto a casing, such as a back plate of the electric machine, while the axially opposing end is free hanging. Those skilled in the art may appreciate that such cantilever arrangement may be more vulnerable to the negative effects of stator torsional resonance.

As mentioned above, the operating principle of electric machines is based on the magnetic field interaction between the rotor and stator. This interaction may create multiple force vectors acting on the external rotor, the sum of which may create a resulting torque on the rotor. Each of the forces acting on the external rotor may have an equal and opposite counterpart force acting on the internal stator. Thus, the internal stator may experience similar torque loading as the external rotor but in an opposite direction. The torque typically contains a mean value along with some parasitic torque ripples. These torque ripples may vary with the relative positioning between the rotor and the stator, and thus, may have frequencies proportional to the motor speed. The torque acting on the internal stator tend to excite the stator and causing movement in the form of vibration, particularly in the free hanging end. As the motor can be use in a broad range of speed defined in terms of revolutions per minute (RPM), the exciting forces on the internal stator may have a broad range of frequency. At some specific RPM, the exciting forces become synchronized with the torsional mode of the stator, which is defined as torsional resonance. During torsional resonance, the vibration amplitude increases significantly, which in turn can lead to high noise emission and/or mechanical damage.

Accordingly, there is a need for a device that at least partially ameliorates torsional resonance in external rotor motors.

SUMMARY OF THE INVENTION

In one aspect of the present disclosure, there is provided a tuned mass damper for an electric machine having an rotor coaxially aligned with a stator, the damper comprising: a body; and a mounting mechanism configured to couple the body onto a mounting surface of the stator, the mounting mechanism is configured with a rigidity; wherein the rigidity permits the body to oscillate at a first frequency at least partially out of phase with the stator at a stator resonance frequency.

In another aspect of the present disclosure, there is provided a tuned mass damper for an electric machine having an rotor coaxially aligned with a stator, the damper comprising: a first body fixedly coupled to a mounting surface of the rotor; a second body; a compression element positioned in between and thereby coupling the first and second bodies; wherein the compression element is configured to permit the second body to oscillate at a first frequency at least partially out of phase with stator oscillation at a stator resonance frequency.

In a further aspect of the present disclosure, there is provided a tuned mass damper for an electric machine having an rotor coaxially aligned with a stator, the damper comprising: a first body fixedly coupled to a mounting surface of the stator; a second body concentric to the first body; a compression element positioned in between and for coupling the first and second bodies; wherein the compression element is configured to permit the second body to oscillate at a first frequency at least partially out of phase with stator oscillation at a stator resonance frequency.

In a further still aspect of the present disclosure, there is provided a tuned mass damper for an electric machine having an rotor coaxially aligned with a stator, the damper comprising: a body; a fastener configured to couple the body to a mounting surface of the stator; an insert mechanism configured to receive the fastener therethrough; and a compression element having a rigidity and is configured to permit the body to oscillate at a first frequency at least partially out of phase with stator oscillation at a stator resonance frequency; wherein the fastener is adjustable to vary a compressive force exerted onto the compression element by the insert mechanism thereby adjusting the rigidity of the compression element.

In any of the above, the first frequency may be naturally out of phase with the stator resonance frequency.

In any of the above, the body may have a mass; and wherein the mass and the rigidity determine the first frequency.

In any of the above, the mounting mechanism may comprise a compression element configured to be deformed during the damper oscillation, wherein the compression element defines the rigidity of the mounting mechanism.

In any of the above, the mounting mechanism may further comprise a plurality of openings that are evenly spaced along a periphery edge of the body.

In any of the above, the mounting mechanism may further comprise a plurality of openings that are unevenly spaced along a periphery edge of the body.

In any of the above, the plurality openings may be grouped into a plurality of groups of openings that are spaced along a periphery edge of the body.

In any of the above, the mounting mechanism may comprise a connection arm configured to couple a fastener to the body; wherein the connection arm defines a rigidity of the mounting mechanism.

In any of the above, the mounting mechanism may comprise a fastener configured for coupling the body onto the mounting surface; an opening formed on the body; and a compression element partially filling the opening and configured to receive the fastener therethrough; wherein during stator resonance frequency, the body and the fastener cause the compression element to deform such that the body oscillates at the first frequency.

In any of the above, the mounting mechanism may comprise a fastener configured for coupling the body onto the mounting surface; an opening formed on the body; and a spring member configured to secure the fastener to the body; wherein the spring member is configured with a spring constant that permits the body to oscillate at the first frequency.

In any of the above, the mounting mechanism may be an adhesive couples the body onto the mounting surface and permits relative movement therebetween.

In any of the above, the rotor may be an external rotor, and the stator is an internal stator, and the electric machine is in a cantilever arrangement with the external rotor and internal stator fixedly mounted at a first end, while a second end opposing the first end is left free hanging.

BRIEF DESCRIPTION OF THE DRAWINGS

Reference will now be made, by way of example, to the accompanying drawings which show example embodiments of the present application, and in which:

FIG. 7A shows a partial top view of a tuned mass damper in accordance with another aspect of the present disclosure;

FIG. 7B shows an elevation cross-sectional view of the mounting mechanism shown in FIG. 7A taken along the A-A line;

FIG. 7C shows an elevation cross-sectional view of the mounting mechanism shown in FIG. 7A taken along the B-B line;

FIG. 8A shows a partial top view of a tuned mass damper in accordance with a further aspect of the present disclosure;

FIG. 8B shows an elevation cross-sectional view of the mounting mechanism shown in FIG. 8A taken along the A-A line;

FIG. 8C shows an elevation cross-sectional view of the mounting mechanism shown in FIG. 8A taken along the B-B line;

Similar reference numerals may have been used in different figures to denote similar components.

DESCRIPTION OF EXAMPLE EMBODIMENTS

Figure 1:
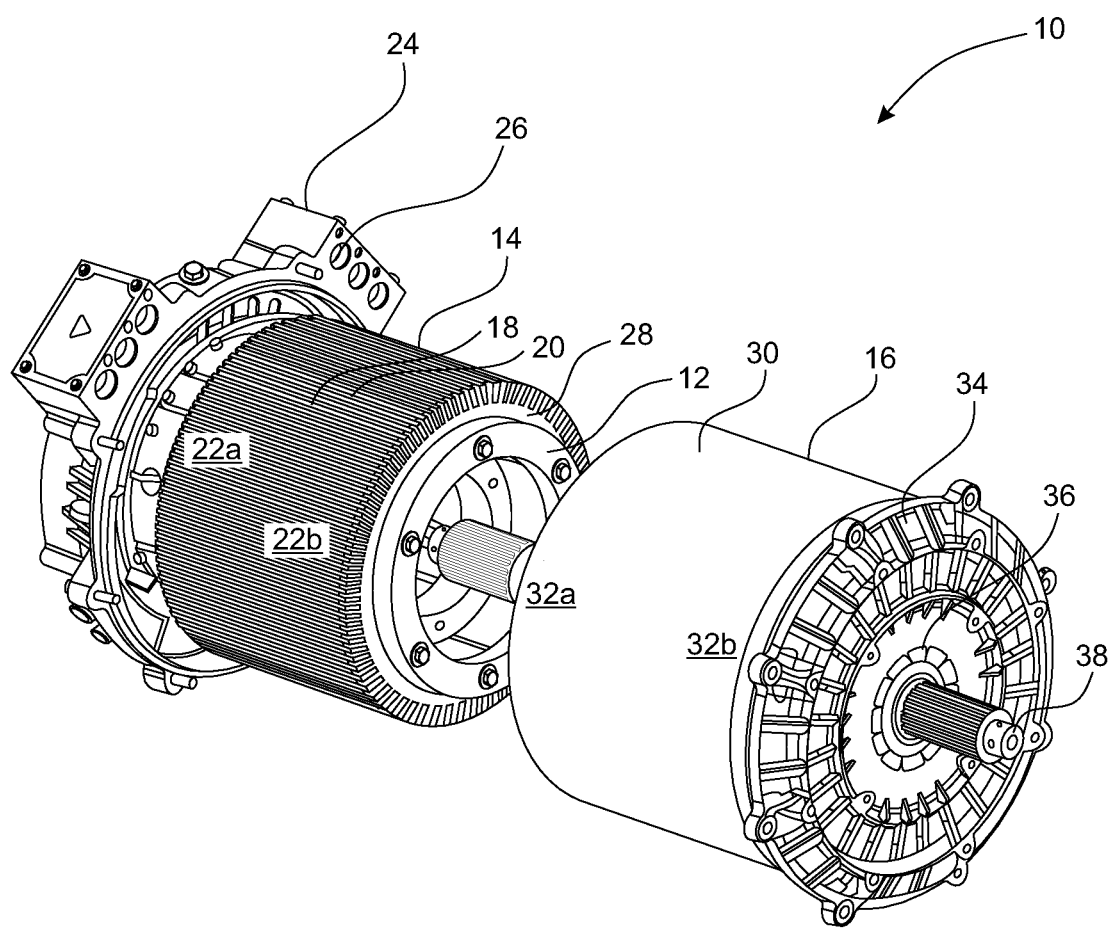
FIG. 1 shows a partially exploded isometric view of an electric machine comprising a tuned mass damper in accordance with one example embodiment of the present disclosure.

FIG. 1 is a partially exploded isometric view of selected components of an electric machine 10, showing one possible implementation of a tuned mass damper in accordance with exemplary embodiments of the present disclosure. It may be apparent from the present disclosure that the tuned mass damper disclosed herein can be applied to any motor topology, and especially for an external-rotor type of electric machine in cantilever arrangement. The electric machine 10 may be of any suitable electric system, such as a dual output motor as shown in FIG. 1.

In the illustrated embodiment of FIG. 1, the electric machine 10 includes a mass tuned damper 12, which is mounted onto an internal stator 14. An external rotor 16 is configured to be in coaxially sleeved relationship with the internal stator 14. Although an external rotor electric machine 10 is shown, it is to be appreciated that the tuned mass damper in accordance with the present disclosure may also be applied to other types of electric machine configuration, such as the internal rotor type.

The stator 14 may be made out of multiple stacked laminations 18 forming outwardly facing slots 20 typically filled with coils, which are omitted in the figures for clarity. The stator 14 includes a first longitudinal end 22a and an opposing second longitudinal end 22b as shown. As shown in FIG. 1, the first end 22a is coupled to a base 24, which, in a cantilever arrangement, may be securely fastened onto a rigid structure such as a motor casing (not shown) while the second longitudinal end 22b of the stator 14 is left free hanging. A skilled person may appreciate that other cantilever arrangement of the electric machine 10 may be possible. In FIG. 1, one embodiment of the base 24 is shown to include one or more connectors 26 for receiving electrical cables carrying alternating current used to energize the coils. In the illustrated embodiment, the tuned mass damper 12 is coupled onto an end mounting surface 28 of the stator 14 at the free hanging second longitudinal end 22b.

As shown, the external rotor 16 comprising a cylindrically shaped receptacle 30 defining a first longitudinal end 32a and an axially opposing second longitudinal end 32b. The receptacle 30 which may be fitted with inwardly facing permanent magnets (not shown) on an interior surface. In the illustrated embodiment, the rotor 16 further comprises a front plate 34 fastened onto the receptacle 30 at the longitudinal end 32b. The front plate 34, on an interior surface, may comprise one or more bearings for supporting the rotor 16. A hub 36 is provided in the cap 34 coaxially with the receptacle 30. The hub 36 may be configured to receive therethrough an input/output shaft 38 internally or externally with respect to the receptacle 30. When the internal stator 14 is coaxially received within the external rotor 16, the longitudinal ends 32a, 32b align with longitudinal ends 22a, 22b of the stator 14, respectively.

As mentioned above, an alternating current received at base 24 may be used to energize the coils on the stator 14. The energized coils in turn create electromagnetic field that interacts with the permanent magnets on the stator 14 to rotate rotor 16, which then rotates the shaft 38. This magnetic interaction may create multiple force vectors acting on the external rotor 16, the sum of which may create a resulting torque on the rotor. Each of the force vector acting on the external rotor 16 may have an equal and opposite counterpart force acting on the internal stator 14. Thus, the internal stator 14 may experience similar torque loading as the external rotor 16 but in an opposite direction. The torque typically contains a mean value along with some parasitic torque ripples. These torque ripples may vary with the relative positioning between the rotor 16 and the stator 14, and thus, may have frequencies proportional to the motor speed. The torque acting on the internal stator 14 tends to excite the stator and thereby causes movement in the form of vibration, particularly in the free hanging end 22b. At a specific rotational speed, the exciting forces become synchronized with the torsional mode of the stator 14, which is defined as stator torsional resonance.

By attaching a tuned mass damper in accordance with the present disclosure to the stator via a mounting mechanism, the effects of the stator torsional resonance experienced at resonance frequency may be minimized. Specifically, in one embodiment, the tuned mass damper in accordance with the present disclosure may be configured to oscillate at the stator's natural frequency, but naturally out of phase with that of the stator, thereby resulting in the overall displacement of the stator being at least partially lessened. In another embodiment, the tuned mass damper in accordance with the present disclosure may convert kinetic energy of the stator to another form of energy, such as thermal energy for example, which may also lessen the displacement of the stator.

Figure 2:
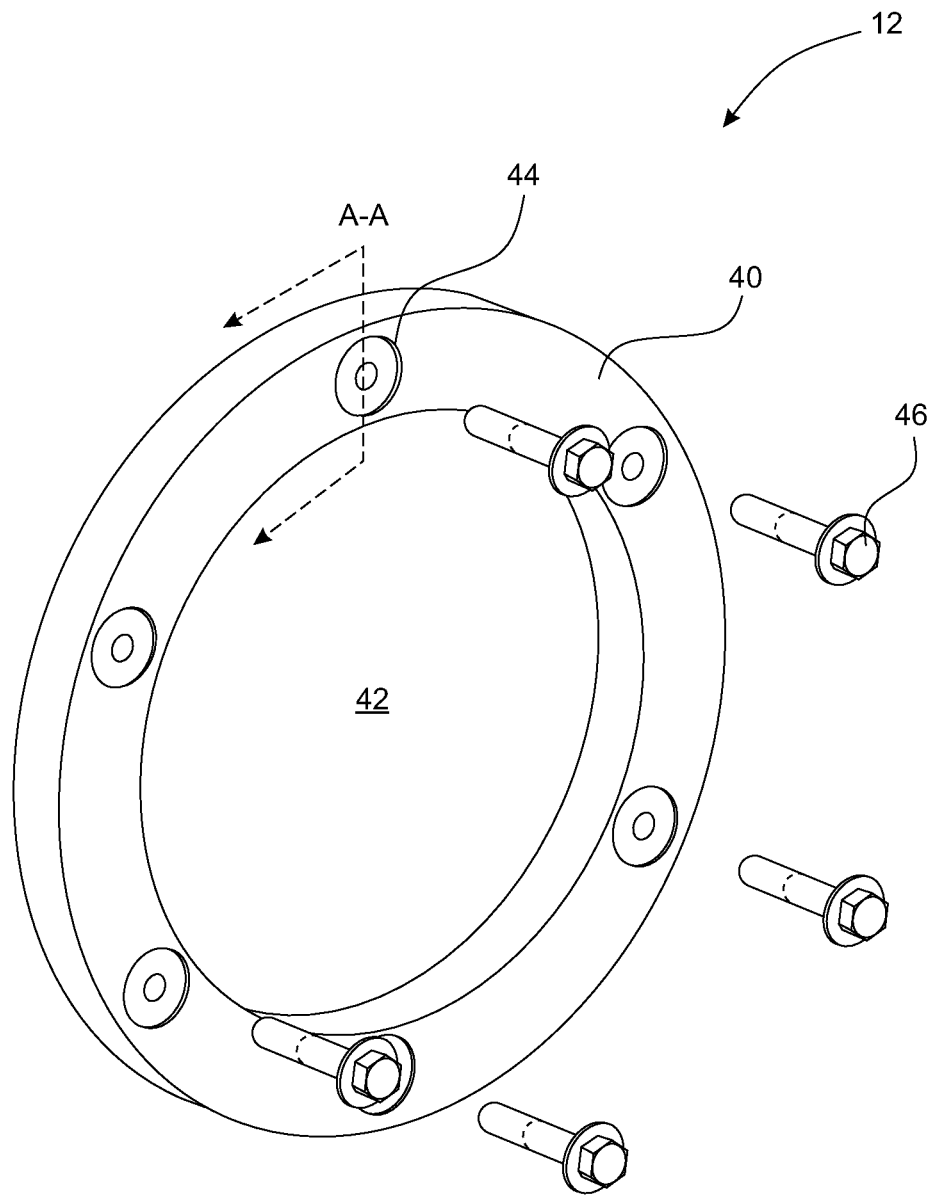
FIG. 2 shows an isometric view of the tuned mass damper in FIG. 1.

FIG. 2 illustrates one exemplary embodiment of tuned mass damper 12 as shown in FIG. 1 in greater detail. The illustrated tuned mass damper 12 comprises a discoidal body 40 with a central bore 42. In the illustrated embodiment, the tuned mass damper 12 is coupled to the stator 14 at a plurality of mounting points 44 that are evenly spaced along the circumference of damper body 40. Each of the mounting points 44 is configured to receive a fastener 46 for securing the tuned mass damper 12 onto the mounting surface 28. The fastener 46 may be configured to threadingly engage a corresponding mounting hole on the mounting surface 28 of stator 14. A skilled person may appreciated that any other suitable types of mounting mechanism may also be used as discussed in more detail below.

Even though body 40 is shown to be discoidal, it is understood that any other shape may be suitable. However, a circular disc may possess even weight distribution in all directions and thus may be preferred for simpler tuning and configuration. The body 40 may be configured to have a mass value that is suitable for counteracting the torsional movement of the stator 14. By way of a non-limiting example, the mass tuned damper 12 may be configured to have approximately 10% of the modal mass of the natural mode of the stator 14. As known by those skilled in the art, the modal mass refers to the amount of mass that is in motion during the resonance event. The modal mass may vary based on the mass of the resonating component and the shape of the motion.

Central bore 42 may be configured with a sufficient diameter to at least permit the shaft 38 to pass therethrough unimpeded, while also taking into consideration possible torsional movement of the stator. In embodiments where space for accommodating the tuned mass damper 12 within electric machine 10 is limited, it may be preferred to decrease the size of bore 42 to achieve desired damper mass. In embodiments where the shaft 38 is not required to fit through the tuned mass damper 12, central bore 42 may be omitted and/or decreased in size to possibly serve as a mounting point 44.

Figure 3:
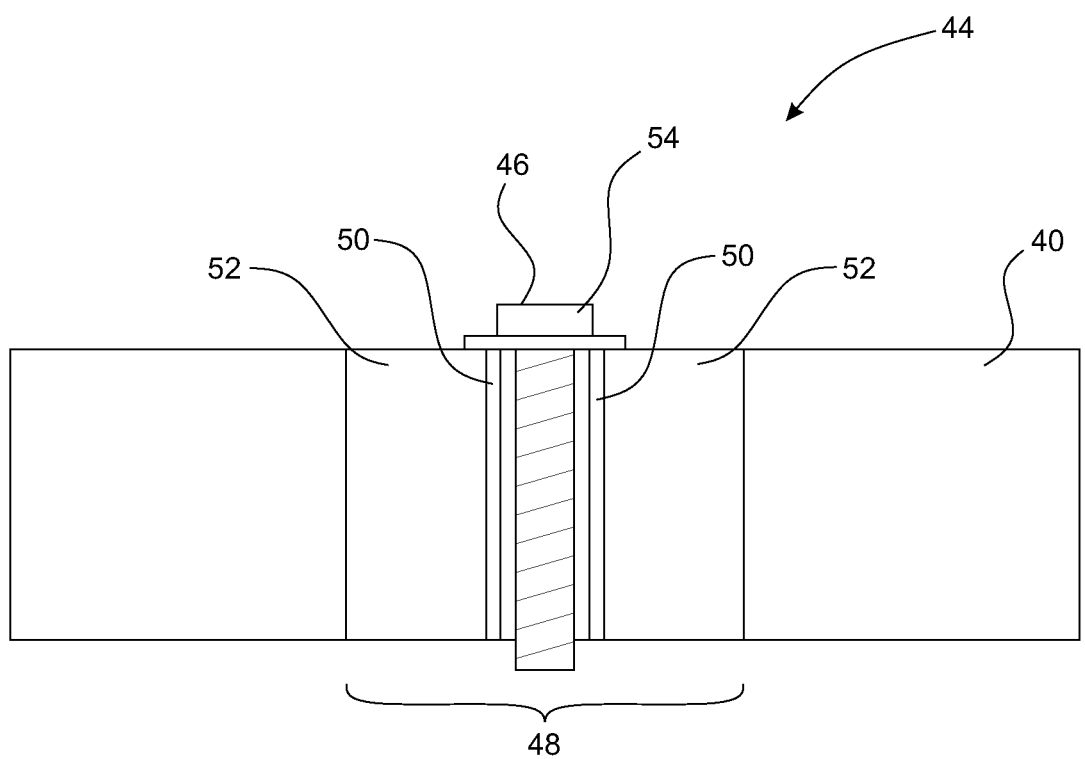
FIG. 3 shows an elevation cross-sectional view of one of the openings 46 as taken along the A-A line in FIG. 2.

FIG. 3 shows each of the mounting point 44 from FIGS. 1 and 2 in greater detail. Specifically, each of the plurality of mounting point 44 comprises a mounting opening 48 that, in some embodiments, coaxially receives a compression limiter 50. In the illustrated embodiment, a compression element 52 may be press fitted, or any other suitable means such as attached via adhesive, to fill the space between the compression limiter 50 and the interior wall of the mounting opening 48. In the embodiment shows in FIG. 3, the compression limiter 52 is coaxially positioned within the mounting opening 48 with equal amount of compression element 52 surrounding the compression limiter 52 in all radial directions. As shown, the compression limiter 50 is a tubular structure that is configured to receive a fastener 46 therethrough. The compression limiter 50 may be resiliently fitted around the fastener 46 such it presents a fixed barrier against further movement of the compression element 52 along the lateral direction perpendicular to the lengthwise direction of the fastener 46. As mentioned above, in some embodiments, the fastener 46 may threadingly engage a fastening hole formed on the mounting surface 28. In some further embodiments, the fastener 46 may also threadingly engage the interior surface of the compression limiter 50. In further still embodiments, once the fastener 46 is received through the compression limiter 50, a gap may exist between the interior surface of the compression limiter 50 and the fastener 46. In FIG. 3, the fastener 46 includes a head 54 that is of larger diameter than that of the central bore of the compression limiter 50 such that the head 54 rests upon, and is prevented from going through, the compression limiter 50.

The compression element 52 preferably possesses a predetermined rigidity such that it may be compressible when force is exerted thereon. In some embodiments, the compression element 52 may be made out of a synthetic silicon polymer material. Those skilled in the art may appreciate that any other suitable material may be used. Upon movement of the damper body 40 during resonance, the damper body 40 may vibrate and exert force upon the compression element 52 and cause the compression element 52 to be compressed between the interior surface of mounting opening 48 and the compression limiter 50. The rigidity of the compression element 52 would dictate the amount of compression and the hence the amount of movement of the damper body 40 with respect to the fixed mounting point 44 centered on a securely fastened fastener 46.

The tuned mass damper is, in at least one aspect, a spring-mass dynamic system. Thus, its resonance frequency may directly correlate with the ratio of compression element rigidity over the damper mass. Accordingly, the resonance frequency of the damper may be adjusted by modifying the rigidity of the compression element 52 and/or the mass of the damper body 40. In some preferred embodiments, the rigidity of the compression element 52 remains constant or with minimal variation over the entire operating temperature range of the electric machine 10. In some embodiments, the resonance frequency of the tuned mass damper 12 is naturally out of phase with the torsional resonance of the stator.

In the embodiment shown in FIGS. 1 and 2, even though the mounting points 44 is shown to include six mounting openings 48, it is to be understood that any number of mounting openings 48 may be used. As it may be appreciated that an increase number of mounting points 48 may result in the damper 12 being more rigid with respect to the stator 14 as each point of connection offers added resistance to damper movement. Conversely, the less number of mounting points for forming connections, the more flexible the damper movement may be. In some embodiments, the mounting mechanism may include at least two points of connection formed on diametrically opposing ends of the body 40. In embodiments where the shaft 38 does not pass through the mounting surface 28, the tuned mass damper 12 may be attached to the mounting surface 28 via a single point of connection, preferably located directly over the center of the tuned mass damper 12.

In some embodiments, the points of connection of the mounting mechanism 44 may be evenly spaced along the peripheral edge of the damper body 40 as shown in FIG. 2. In some other embodiments, a subset of points of connection may be located in close proximity to one another thereby forming a connection point group, and a plurality of connection point groups may be evenly spaced along the peripheral edge of the body 40. In some further embodiments, the points of connection, or connection point groups, may be unevenly distributed along the periphery edge to, for example, counteract uneven force distribution on the free hanging end 22b of the stator 14. It is to be appreciated that other arrangements of the points of connection may be possible. By way of a non-limiting example, in some embodiments, the damper body 40 may be coupled to the mounting surface 28 via an adhesive thereby defining practically infinite number of points of connection. In some embodiments, the adhesive may serve as the compression element 52 between the tuned mass damper 12 and the stator 14. Fasteners 46 may be omitted from such embodiments. In some other embodiments, the adhesive may be applied to select areas of the damper body 40. By way of non-limiting example, the adhesive may be applied to a bottom surface of the damping elements 50, which may completely fill the mounting openings 48 with no fasteners 46.

Each of the openings 46 is circular in shape in the illustrated embodiment. As may be appreciated by those skilled in the art, circular openings may allow simpler tuning process as the range of motion in all directions may be equal. Additionally, the compression element 52 located within a circular opening 44 may experience equal compression in all directions and thus present similar rigidity regardless of the direction of movement. It is to be appreciated that other opening shapes are permissible with proper tuning.

Figure 4:
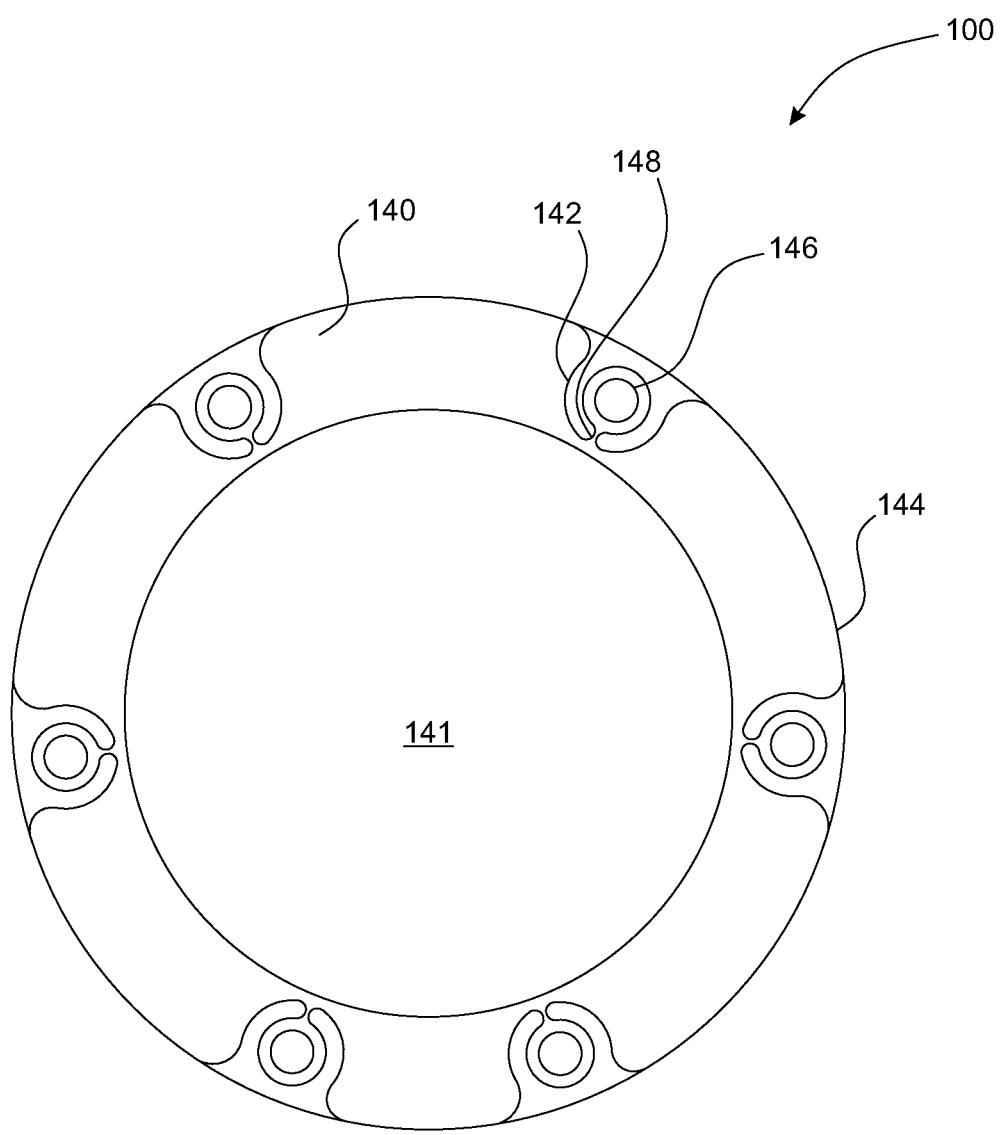
FIG. 4 shows a front elevation view of a mass tuned damper in accordance with another example embodiment of the present disclosure.

FIG. 4 shows a tuned mass damper 100 in accordance with another example embodiment of the present disclosure. The tuned mass damper 100 comprises a body 140 that defines a central opening 141 for permitting other components, such as the shaft 38, to pass therethrough. The mounting mechanism consists of six cavities 142 formed on the outer circumferential edge 144 of the damper body 140. A mounting ring 146 is attached to the nadir point of the cavity 142 via a connection arm 148. The mounting ring 146 is configured to receive a fastener (not shown) therethrough. Each mounting ring 146 may be partially filled with a damping element (not shown) of a predetermined rigidity that fittingly receives a fastener and provide damping function similar as disclosed above. Alternatively, the connection arm 148 may be formed from a material of predetermined rigidity that permits movement of the tuned mass damper 100 within the confines of the cavity 142. Although six cavities, or points of connection, are shown, it may be appreciated the number of cavities may vary.

Figure 5:
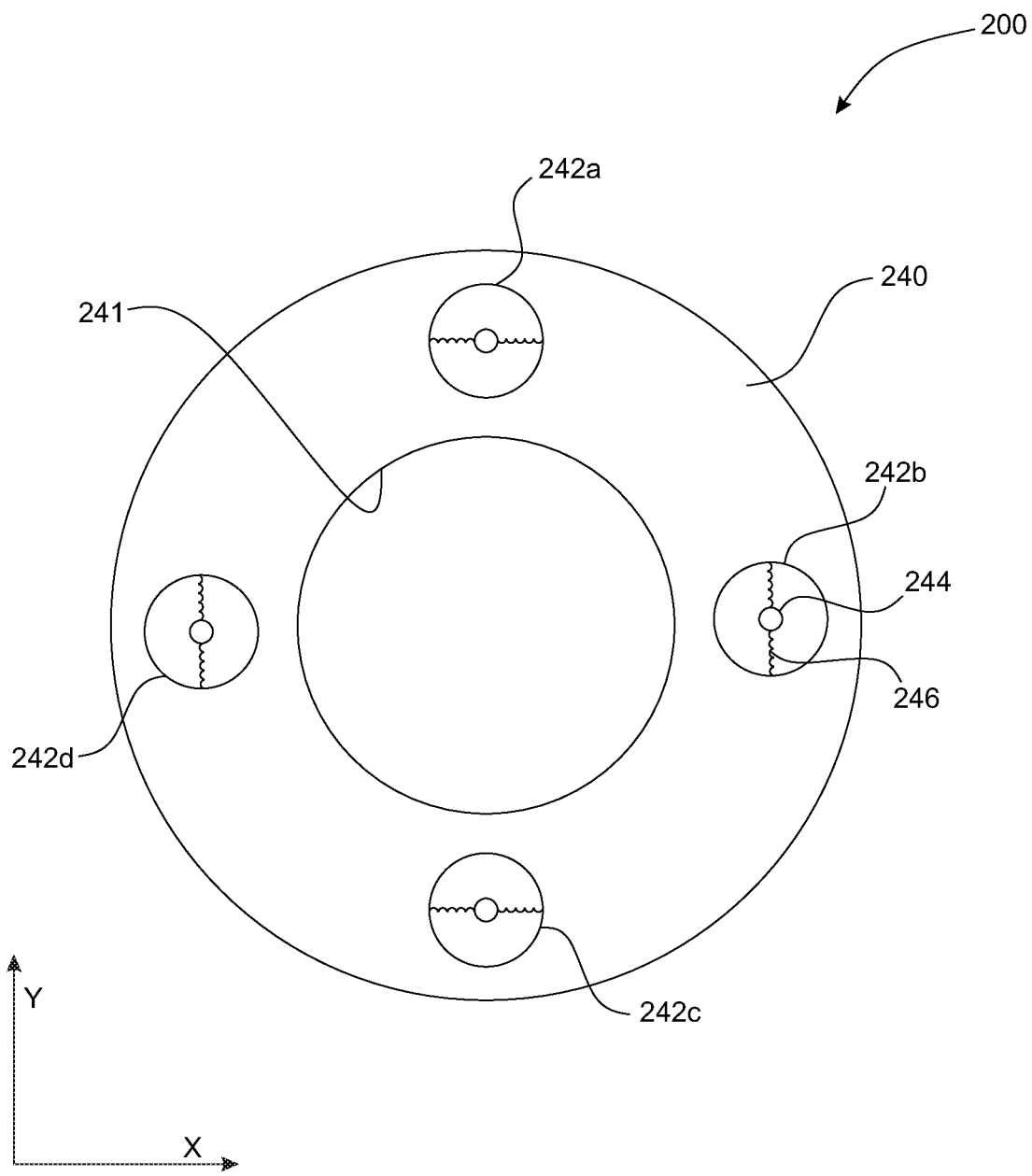
FIG. 5 shows a front elevation view of a mass tuned damper in accordance with a further example embodiment of the present disclosure.

FIG. 5 shows a tuned mass damper 200 in accordance with another example embodiment of the present invention. The damper 200 comprises a body 240 that defines a central opening 241 for permitting other components, such as the shaft 38, to pass therethrough. In the illustrated embodiment, the mounting mechanism includes four generally circular opening 242a, 242b, 242c, and 242d (collectively referred to as openings 242) even spaced along the circumferential direction of the body 240, each of the openings 242 is configured to receive a fastener 244 for mounting damper 200 onto the mounting surface 28 of stator 14. Alternatively, a compression limiter (not shown) may be received in the opening 242, and the fastener 244 is received within the compression limiter. As shown, each fastener 244 is located concentrically within each circular opening 242. Two spring members 246 with a predefined spring constant connects the fastener 244, or compression limiter, to body 240 in each opening 242. The spring constant of the spring members 246 may be configured to achieve the desired resonance frequency of the damper 200. In the illustrated embodiment, the spring members 246 in openings 242a and 242c are oriented along the X-direction for allowing movement primarily in the X-direction; while the spring members in openings 242b and 242c are oriented along the Y-direction for allowing movement primarily in the Y-direction. The number of X-axis oriented spring members may be equal to, or greater than, or less than, the number of Y-axis oriented spring members 246. It may be appreciated that in some embodiments, the spring members 246 may be oriented in any direction in the X-Y plane.

As may be appreciated, the circular shape of openings 242 may permit any number of spring members 246 to be used. In some further embodiments, each fastener 244 or compression limiter (not shown) may be coupled to the body 240 via multiple spring members 246 that are oriented in any direction, preferably evenly spaced around the fastener 244 within each opening 242.

In the embodiment show in FIG. 5, the damper body 240 preferably vibrates naturally out of phase with the stator 14. The fasteners 244, which may be received in a compression limiter (not shown), remains fixed in position while the spring members 246 either extend or retract depending on the motion of the damper body 240.

Figure 6A:
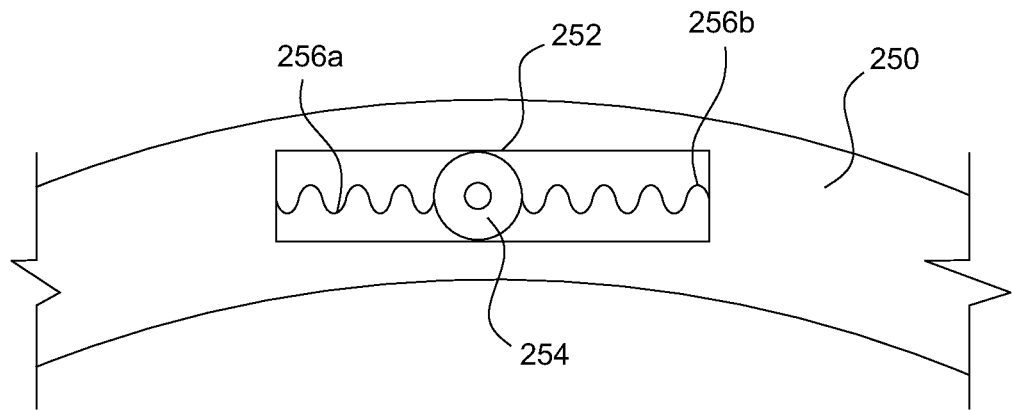
FIG. 6A shows an enlarged elevation view of a mounting mechanism in accordance with the present disclosure where spring members are in their natural state.
Figure 6B:
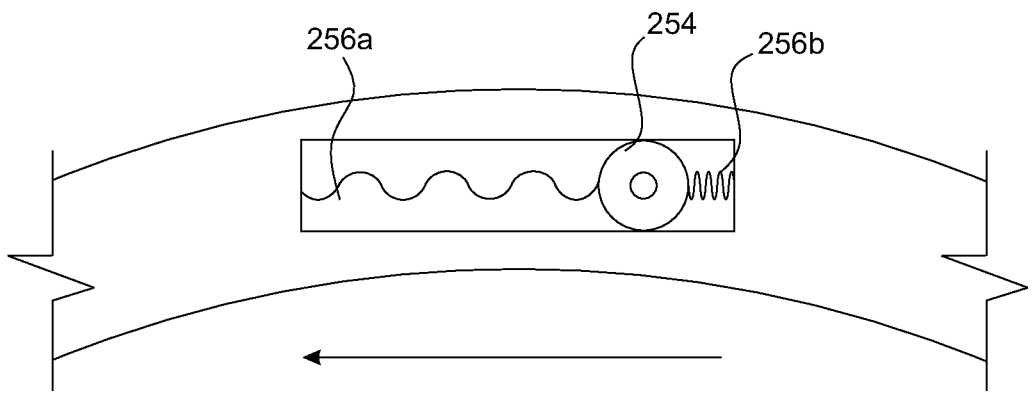
FIG. 6B shows an enlarged elevation view of the mounting mechanism in FIG. 6A where the two spring members are in their stretched and compressed states respectively in response to damper body movement in a first direction.
Figure 6C:
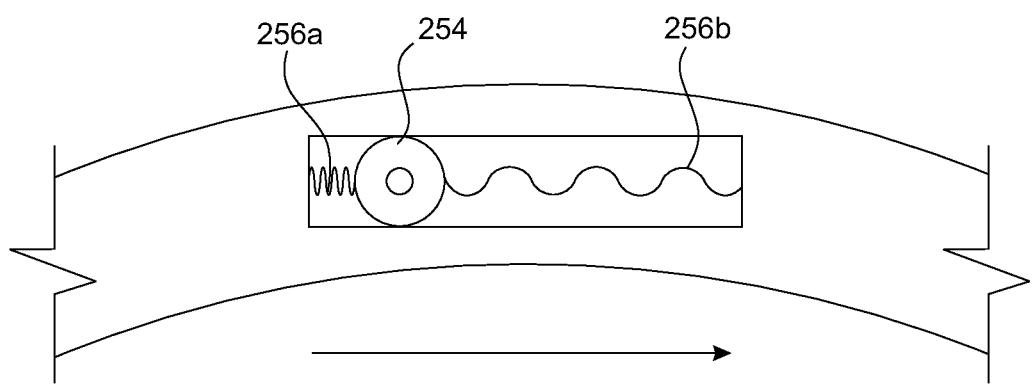
FIG. 6C shows an enlarged elevation view of the mounting mechanism in FIG. 6A where the two spring members are in their stretched and compressed states respectively in response to damper body movement in a second direction, opposite to the first direction in FIG. 6B.

FIGS. 6A-6C illustrate a further embodiment of the spring member based mass tuned damper in accordance with the present disclosure. Specifically, FIG. 6A shows a partial view of damper body 250 that includes a generally rectangular opening 252. A fastener 254 is positioned within the opening 252, preferably near the half way point along the lengthwise direction of the opening. Two spring members 256a and 256b attach the fastener 254, or the compression limiter, to either lengthwise ends of the opening 252a as shown. The spring members 256a and 256b may be compressed to a first compressed state or to be stretched to an extended state. FIG. 6B shows the damper body 250 moving in the general direction indicated by the arrow. During damper body 250 movement in the indicated direction, the left side of the opening 252 is moving away from the fixed fastener 254, thus stretching the spring member 256a to an extended state. Correspondingly, the right side of the opening 252 moves closer to the fixedly placed fastener 254 and compresses the spring member 256b to a compressed state. The tendencies in spring members 256a and 256b to return to their normal states may counter damper body 240 kinetic force. FIG. 6C shows damper body 250 movement in the opposite direction as indicated by the arrow, which causes spring member 256a to extend and spring member 256b to compress. The same operating principle may be applied mutatis mutandis to embodiments with any number of spring members in other orientations.

FIGS. 7A-7C show yet another embodiment of the present invention. Specifically, FIG. 7A shows a top elevation view of a section of a tuned mass damper 300 in accordance with the present invention. One mounting point 302 is shown to be situated on the damper body 304. Similar to other embodiments discloses herein, any number of mounting points 302 may be positioned along the circumferential length of the damper body 304.

FIG. 7B shows a cross-sectional view of the damper body 304 taken along the line A-A in FIG. 7A. As can be seen, the damper body 304 consists of two vertically stacked rings, a top moving ring 306 and a bottom fixed ring 308 separated by a layer of compression element 52.

FIG. 7C shows a cross-sectional view of the damper body 304 taken along the line B-B in FIG. 7A. As shown, the mounting point 302 includes an opening 310 with a first diameter dimensioned to permit passage of a fastener 314. A similar sized opening is also formed in the compression element 52 layer. The fixed ring 308 has a hole 312 formed at the corresponding location with a second diameter configured to permit the body of the fastener 314 to pass therethrough. In the illustrated embodiment, the first diameter is greater than the second diameter such that the head portion 316 of the fastener 314 is estopped and rests upon the fixed ring 308. The fastener 314 extends through the hole 312 and may further securely engage a corresponding opening on the mounting surface 28 on the stator 14.

Accordingly to FIGS. 7A-7C, the fixed ring 308 is secured onto the mounting surface 28 of the stator 14 by fasteners 314. During stator resonance, the shear deformation of the compression element 52 may permit vibrational movement of the top moving ring 306 above the bottom fixed ring 308. In some embodiments, the vibrational movement of the top moving ring 306 is primarily in the plane parallel to the mounting surface 28 of the stator 14, and may be naturally out of phase with the stator oscillation during resonance.

FIGS. 8A-8C show yet another embodiment of the present invention. Specifically, FIG. 8A shows a top elevation view of a section of a tuned mass damper 400 in accordance with the present invention. In the illustrated section, one mounting point 402 is shown to be situated on the damper body 404. Similar to other embodiments discloses herein, any number of mounting points 402 may be positioned along the circumferential length of the damper body 404.

FIG. 8B shows a cross-sectional view of the damper body 404 taken along the line A-A in FIG. 8A. As can be seen, the damper body 404 consists of two concentric rings, an inner moving ring 406 and an outer fixed ring 408 separated by a layer of compression element 52. The fixed ring 408 includes a vertical body 410 with a horizontal flange 412 perpendicularly extending from one end of the body 410.

FIG. 8C shows a cross-sectional view of the damper body 404 taken along the line B-B in FIG. 8A. As shown, the mounting point 402 includes a hole 414 formed through the horizontal flange 412 of the fixed ring 408 for receiving a fastener 416. In the illustrated embodiment, the fastener 416 extends through the hole 414 so as to be able to securely fasten to a corresponding opening on the mounting surface 28 of the stator 14, and thus fixedly maintaining the outer ring 408 on the mounting surface 28. The fastener 46 extends through the hole 312 and may further securely engage a corresponding opening on the mounting surface 28 on the stator 14.

Accordingly to FIGS. 8A-8C, the fixed outer ring 408 is secured onto the mounting surface 28 of the stator 14 by fasteners 416. During stator resonance, the shear deformation of the compression element 52 may permit vibrational movement of the inner moving ring 406. In some embodiments, the vibrational movement of the moving ring 406 is primarily in the plane parallel to the mounting surface 28 of the stator 14, and may be naturally out of phase with the stator oscillation during resonance.

It may be appreciated that in further embodiments where the tuned mass damper consists of concentric rings, the inner ring may be fixed and the outer ring may be the moving ring that functions mutatis mutandis as embodiments shown in FIGS. 8A-8C. Specifically, a circumferential flange may extend from the inner edge of the inner fixed ring where mounting points may be located for securely fastening the damper onto the mounting surface of the stator. A layer of compression element separates the inner and outer rings so as to permit movement of the outer ring during stator resonance that may be naturally out of phase with the vibration of the stator.

Figure 9A:
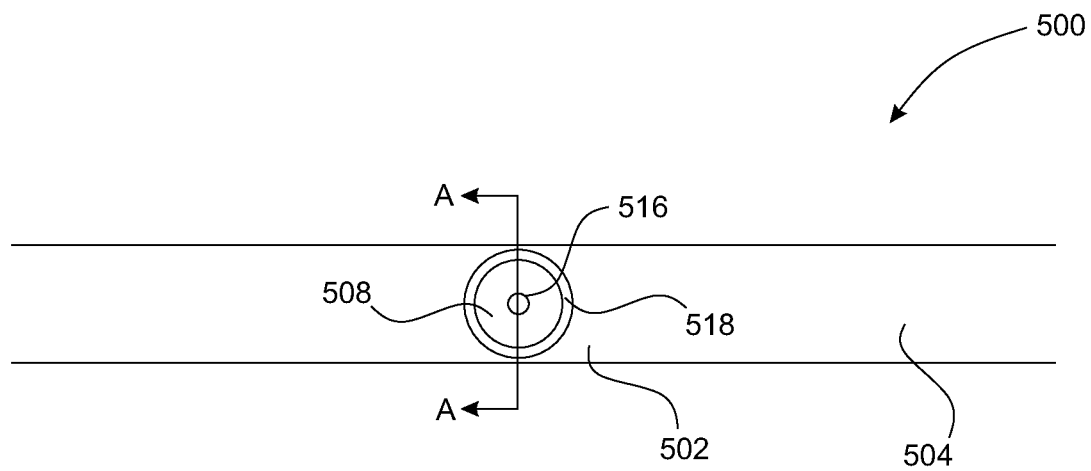
FIG. 9A shows a partial top view of a tuned mass damper in accordance with a still further aspect of the present disclosure.
Figure 9B:
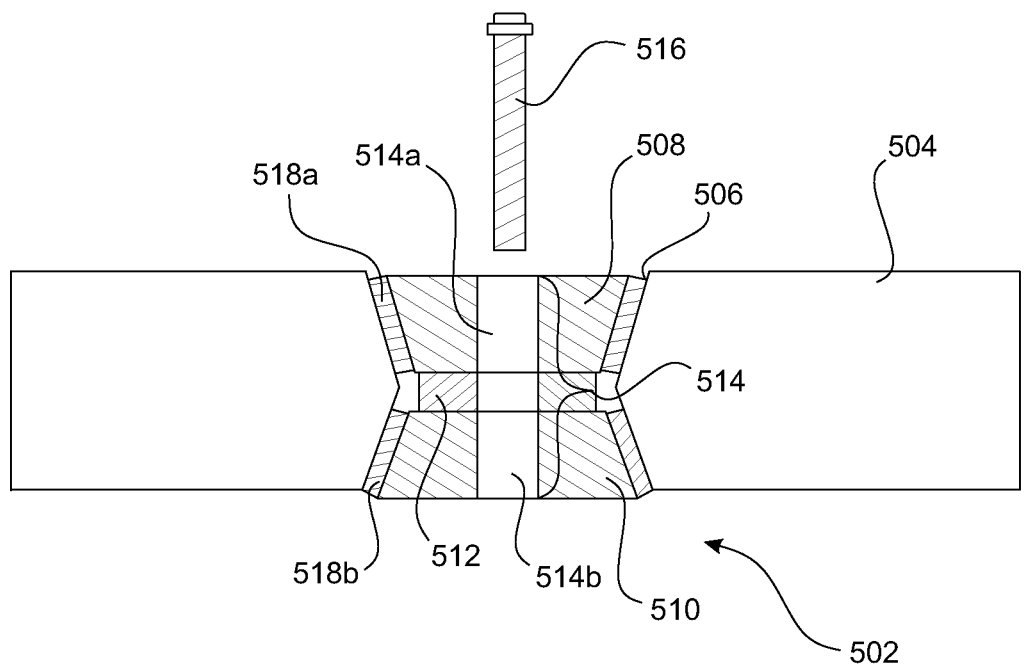
FIG. 9B shows an elevation cross-sectional view of the mounting mechanism shown in FIG. 9A taken along the A-A line.

FIGS. 9A-B show an adjustable tuned mass damper 500 in accordance with yet another embodiment of the present invention. Specifically, FIG. 9A shows a top elevation view of a portion of the tuned mass damper 500 where one mounting point 502 is located on the damper body 504. Similar to other embodiments discloses herein, any number of mounting points 502 may be positioned along the entire circumferential length of the damper body 504.

FIG. 9B shows a cross sectional elevation view of the damper body 504 along the A-A line in FIG. 9A. The mounting point 502 includes a mounting opening 506 formed through damper body 504 where an insert mechanism is received that includes a top insert 508 and a bottom insert 510 are received therein. In the illustrated embodiment, mounting opening 506 is substantially an "hour-glass" shape where the diameter of the opening gradually narrows until approximately half way point and then gradually enlarges to its original size. It is to be appreciated that other shapes of the opening 506 may be possible.

As shown, in order to be fitted into the hour-glass shaped mounting opening 506, both of the top insert 508 and bottom insert 510 are generally in the shape of truncated cones. In some embodiments, the dimensions of the top and bottom inserts 508 and 510 are identical. In other embodiments, differently dimensioned inserts 508 and 510 may be used. As shown in the figures, the inserts 508 and 510 may be separate pieces. When the top and bottom inserts 508 and 510 are received within the opening 506 with the narrow ends facing each other.

In some embodiments, such as the one shown in FIG. 9B, a shim plate 512 is positioned between the two inserts 508 and 510. The shim plate 512 may be of variable thickness, which in turn allows different amount of compression between inserts 508 and 510.

The top insert 508 includes a central bore 514a and the bottom insert 510 includes a central bore 514b. When the top and bottom inserts 508 and 510 are positioned within mounting opening 506, the central bores 514a and 514b align to form fastener bore 514 for receiving a fastener 516 therethrough. The fastener 516 may extend through the fastener bore 514 to be fastened onto a corresponding opening on the mounting surface 28 of the stator 14. In some embodiments, the fastener 516 may be a bolt or screw that is configured to have a downward movement upon being tightened.

In the illustrated embodiment, a compression element 518a is sandwiched between the top inserts 508 and the upper portion of the damper body 504. Similarly, a compression element 518b is sandwiched between the bottom inserts 510 and the lower portion of the damper body 504. Collectively referred to as compression elements 518, compression elements 518a and 518b, may be configured to generally conform to the contours of the inserts 508 and/or 510 on an interior surface and that of the mounting opening 506 on the exterior surface. In some embodiments, compression element 518 may be a single continuous piece that covers both inserts 508 and 510. In further embodiments, the compression element may comprise a plurality of pieces.

Accordingly, the embodiment shown in FIGS. 9A and 9B may provide an "adjustable" tuned mass damper 500. Specifically, the bottom insert 510 may sit on top of the mounting surface 28 which provides a backstop for the insert. As mentioned above, the fastener 516 may be configured to have a downward movement when tightened, which would in turn exert a similar downward force onto the top insert 508. The top insert 508 may then move closer to the bottom insert 510. The inserts 508 and 510 would exert a compressive force onto the compression element 518 against damper body 504, thereby causing shearing deformation of the compression element 518. Accordingly, by adjusting the fastener 516's downward movement, the rigidity of the compression element 518 may be adjusted. The thickness of the shim plate 512 or the space between inserts 508 and 510 allow tuning of the compression amount of the compression elements 518. During stator resonance, the damper body 504 may come in contact with the compression elements 518 and causing further deformation. Hence, the more deformation the compression elements 518 experience from the inserts 508, 510, the less deformation may be possible from force exerted by the damper body 504.

The shim plate 512 also includes a central bore that aligns with bores 514a and 514b to form central bore 514 for permitting fastener 516 to pass therethrough. The central bore of the shim plate 512 may be configured to threadingly engage the fastener 516 and provide additional fastening surface with which to maintain the fastener 516 in place. Further, as it may be appreciated by those skilled in the art, some synthetic polymer material may have the tendency to deform and may creep into any gap that may exist between the top and bottom inserts 508 and 510, which could impact the rigidity of the compression element 518 and hence the damping ability of the tuned mass damper. Thus, shim plate 512 may provide a physical barrier to prevent the compression element 518 from entering the gap between the inserts 508 and 510 and help to maintain the physical integrity of the compression element 518.

Certain adaptations and modifications of the described embodiments can be made. Therefore, the above discussed embodiments are considered to be illustrative and not restrictive. The present disclosure is not to be limited in scope by the specific embodiments described herein. Further example embodiments may also include all of the steps, features, compositions and compounds referred to or indicated in this description, individually or collectively and any and all combinations or any two or more of the steps or features.

FIGS. 1-9B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Throughout this document, the use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more. The words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

In the present specification and in the appended claims, various terminology which is directional, geometrical and/or spatial in nature such as "longitudinal", "horizontal", "front", "forward", "backward", "back", "rear", "upwardly", "downwardly", etc. is used. It is to be understood that such terminology is used for ease of description and in a relative sense only and is not to be taken in any way as specifying an absolute direction or orientation.

The embodiments described herein may include one or more range of values (for example, size, displacement and field strength etc.). A range of values will be understood to include all values within the range, including the values defining the range, and values adjacent to the range that lead to the same or substantially the same outcome as the values immediately adjacent to that value which defines the boundary to the range. For example, a person skilled in the field will understand that a 10% variation in upper or lower limits of a range can be totally appropriate and is encompassed by the disclosure. More particularly, the variation in upper or lower limits of a range will be 5% or as is commonly recognized in the art, whichever is greater.

Throughout this specification relative language such as the words 'about' and 'approximately' are used. This language seeks to incorporate at least 10% variability to the specified number or range. That variability may be plus 10% or negative 10% of the particular number specified.

The invention claimed is:

1. A tuned mass damper for an electric machine having a rotor coaxially aligned with a stator, the damper comprising:
   a body; and
   a mounting mechanism configured to couple the body onto a mounting surface of the stator, the mounting mechanism configured with a rigidity, wherein the mounting mechanism comprises a plurality of openings that are evenly spaced along a periphery edge of the body; and wherein the rigidity permits the body to oscillate at a first frequency at least partially out of phase with the stator at a stator resonance frequency.

2. The damper of claim 1, wherein the first frequency is naturally out of phase with the stator resonance frequency.

3. The damper of claim 1, wherein
the body has a mass; and
the mass and the rigidity determine the first frequency.

4. The damper of claim 3, wherein the mounting mechanism comprises a compression element configured to be deformed during oscillation of the damper oscillation, and wherein the compression element defines the rigidity of the mounting mechanism.

5. The damper of any of claim 1, wherein the plurality of openings are grouped into a plurality of groups of openings that are spaced along a periphery edge of the body.

6. The damper of claim 1, wherein the mounting mechanism comprises a connection arm configured to couple a fastener to the body; and
wherein the connection arm defines the rigidity of the mounting mechanism.

7. A tuned mass damper for an electric machine having a rotor coaxially aligned with a stator, the damper comprising:
a body; and
a mounting mechanism configured to couple the body onto a mounting surface of the stator, the mounting mechanism configured with a rigidity;
wherein the rigidity permits the body to oscillate at a first frequency at least partially out of phase with the stator at a stator resonance frequency, and wherein the mounting mechanism comprises:
a fastener configured for coupling the body onto the mounting surface;
an opening formed on the body; and
a compression element partially filling the opening and configured to receive the fastener therethrough;
wherein, during stator resonance frequency, the body and the fastener cause the compression element to deform such that the body oscillates at the first frequency.

8. The damper of claim 1, wherein the mounting mechanism comprises:
a fastener configured for coupling the body onto the mounting surface;
an opening formed on the body; and
a spring member configured to secure the fastener to the body;
wherein the spring member is configured with a spring constant that permits the body to oscillate at the first frequency.

9. The damper of claim 1, wherein the mounting mechanism is an adhesive couples the body onto the mounting surface and permits relative movement thereinbetween.

10. The damper of claim 1, wherein the rotor is an external rotor and the stator is an internal stator, and wherein the electric machine is in a cantilever arrangement with the external rotor and the internal stator fixedly mounted at a first end, while a second end opposing the first end is left free hanging.

11. A tuned mass damper for an electric machine having a rotor coaxially aligned with a stator, the damper comprising:
a first body fixedly coupled to a mounting surface of the rotor;
a second body;
a mounting mechanism comprising a compression element configured to couple the first and second bodies, wherein the mounting mechanism further comprises a plurality of openings that are unevenly spaced along a periphery edge of the second body;
wherein the compression element is configured to permit the second body to oscillate at a first frequency at least partially out of phase with stator oscillation at a stator resonance frequency; and
wherein the compression element is configured to be deformed during oscillations of the damper.

12. A tuned mass damper for an electric machine having a rotor coaxially aligned with a stator, the damper comprising:
a body;
a fastener configured to couple the body to a mounting surface of the stator;
an insert mechanism configured to receive the fastener therethrough; and
a compression element having a rigidity and is configured to permit the body to oscillate at a first frequency at least partially out of phase with stator oscillation at a stator resonance frequency;
wherein the fastener is adjustable to vary a compressive force exerted onto the compression element by the insert mechanism thereby adjusting the rigidity of the compression element.

* * * * *